US012567534B2

(12) United States Patent
Arai et al.

(10) Patent No.: US 12,567,534 B2
(45) Date of Patent: Mar. 3, 2026

(54) INDUCTOR ARRAY

(71) Applicant: TAIYO YUDEN CO., LTD., Tokyo (JP)

(72) Inventors: Takayuki Arai, Tokyo (JP); Naoya Terauchi, Tokyo (JP); Tomoo Kashiwa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 841 days.

(21) Appl. No.: 17/839,145

(22) Filed: Jun. 13, 2022

(65) Prior Publication Data

US 2023/0005657 A1 Jan. 5, 2023

(30) Foreign Application Priority Data

Jun. 30, 2021 (JP) ................................ 2021-109721

(51) Int. Cl.
*H01F 27/29* (2006.01)
*H01F 27/24* (2006.01)

(52) U.S. Cl.
CPC ............ *H01F 27/29* (2013.01); *H01F 27/24* (2013.01)

(58) Field of Classification Search
CPC .... H01F 27/29; H01F 27/24; H01F 2003/106; H01F 2027/065; H01F 37/00; H01F 2017/048; H01F 27/255
See application file for complete search history.

(56) References Cited

U.S. PATENT DOCUMENTS

| | | | | |
|---|---|---|---|---|
| 10,614,947 | B2 * | 4/2020 | Nakano | H01F 41/043 |
| 2005/0018382 | A1 * | 1/2005 | Takazawa | H01F 17/0013 361/321.2 |
| 2016/0126000 | A1 | 5/2016 | Han et al. | |
| 2017/0006706 | A1 * | 1/2017 | Yoon | H01F 17/0033 |
| 2017/0148561 | A1 * | 5/2017 | Yoon | H05K 1/181 |

FOREIGN PATENT DOCUMENTS

| | | |
|---|---|---|
| JP | 2016-006830 A | 1/2016 |
| JP | 2019-153649 A | 9/2019 |

* cited by examiner

*Primary Examiner* — Mang Tin Bik Lian
(74) *Attorney, Agent, or Firm* — Pillsbury Winthrop Shaw Pittman, LLP

(57) ABSTRACT

An inductor array according to one or more embodiments of the invention includes: a plurality of internal conductors spaced apart from each other along a reference axis; a magnetic base body; a plurality of first external electrodes each connected to one end of associated one of the plurality of internal conductors; and a plurality of second external electrodes each connected to the other end of associated one of the plurality of internal conductors. The magnetic base body may include: a body portion having the plurality of internal conductors embedded therein; and a first high-permeability portion having a higher relative permeability than the body portion.

10 Claims, 10 Drawing Sheets

INDUCTOR ARRAY

CROSS-REFERENCE TO RELATED APPLICATIONS

This application is based on and claims the benefit of priority from Japanese Patent Application Serial No. 2021-109721 (filed on Jun. 30, 2021), the contents of which are hereby incorporated by reference in their entirety.

TECHNICAL FIELD

The present disclosure relates to an inductor array, a circuit board including the inductor array, and an electronic device including the circuit board.

BACKGROUND

An inductor array including a plurality of inductors has been known. A plurality of inductors are packaged in a single chip to form such an inductor array. A conventional inductor array includes, for example, a base body, a plurality of internal conductors provided in the base body and insulated from each other in the base body, and a plurality of external electrodes connected to the plurality of internal conductors at respective ends thereof. Examples of the conventional inductor array are disclosed, for example, in Japanese Patent Application Publication No. 2016-006830 and Japanese Patent Application Publication No. 2019-153649.

When an inductor array including a plurality of inductors packaged together is mounted on a substrate, it occupies a smaller installation space than a plurality of inductors separately mounted on a substrate.

To further reduce the installation space, it is desirable to further downsize the inductor array. However, when the inductors included in the inductor array are arranged closer to each other, the magnetic coupling between the inductors is increased, and this makes it difficult for the inductors to exhibit desired characteristics.

SUMMARY

One object of the present disclosure is to overcome or reduce at least a part of the above drawback. One particular object of the present invention is to provide an inductor array having lessened magnetic coupling between the inductors.

Other objects of the present invention will be made apparent through the entire description in the specification. The invention disclosed herein may address other drawbacks in addition to the drawback described above.

An inductor array according to one or more embodiments of the invention comprises: a plurality of internal conductors spaced apart from each other along a reference axis; a magnetic base body; a plurality of first external electrodes each connected to one end of associated one of the plurality of internal conductors; and a plurality of second external electrodes each connected to the other end of associated one of the plurality of internal conductors. The magnetic base body may include: a body portion having the plurality of internal conductors embedded therein; and a first high-permeability portion having a higher relative permeability than the body portion. The first high-permeability portion may occupy at least a part of an inter-conductor region between a first internal conductor and a second internal conductor among the plurality of internal conductors, the first internal conductor and the second internal conductor being adjacent to each other in a reference axis direction along the reference axis.

In one or more embodiments, the first high-permeability portion is in contact with at least one of the first internal conductor or the second internal conductor.

In one or more embodiments, the first high-permeability portion extends in the reference axis direction over an intermediate point between the first internal conductor and the second internal conductor in the reference axis direction.

In one or more embodiments, the first high-permeability portion is positioned to cover entire regions of the first internal conductor and the second internal conductor as viewed from the reference axis direction.

In one or more embodiments, the magnetic base body has a first surface, a second surface opposed to the first surface in the reference axis direction, and a third surface connecting between the first surface and the second surface. In one or more embodiments, the magnetic base body includes a second high-permeability portion having a higher relative permeability than the body portion. The second high-permeability portion may occupy at least a part of a margin region between the inter-conductor region and the third surface.

In one or more embodiments, the body portion interposes between the first internal conductor and the third surface and between the second internal conductor and the third surface.

In one or more embodiments, the magnetic base body has a fourth surface opposed to the third surface. The second high-permeability portion may occupy at least a part of a second margin region between the inter-conductor region and the fourth surface.

In one or more embodiments, the first high-permeability portion is in contact with the second high-permeability portion.

In one or more embodiments, the magnetic base body includes a first low-permeability portion having a lower relative permeability than the body portion. The first low-permeability portion may occupy at least a part of a margin region.

In one or more embodiments, the first low-permeability portion extends from the inter-conductor region to the third surface in an orthogonal direction orthogonal to the reference axis direction.

In one or more embodiments, the magnetic base body includes a second low-permeability portion having a lower relative permeability than the body portion. The second low-permeability portion may occupy at least a part of the inter-conductor region.

In one or more embodiments, the body portion interposes between the second low-permeability portion and each of the first internal conductor and the second internal conductor.

In one or more embodiments, both the first low-permeability portion and the second low-permeability portion have a relative permeability equal to or less than a half of a relative permeability of the body portion.

An embodiment of the present invention relates to a circuit board including any one of the above-described inductor arrays.

An embodiment of the present invention relates to an electronic device comprising the above circuit board.

Advantageous Effects

The techniques disclosed herein can provide an inductor array having lessened magnetic coupling between the inductors.

DESCRIPTION OF EXAMPLE EMBODIMENTS

Figure 1:
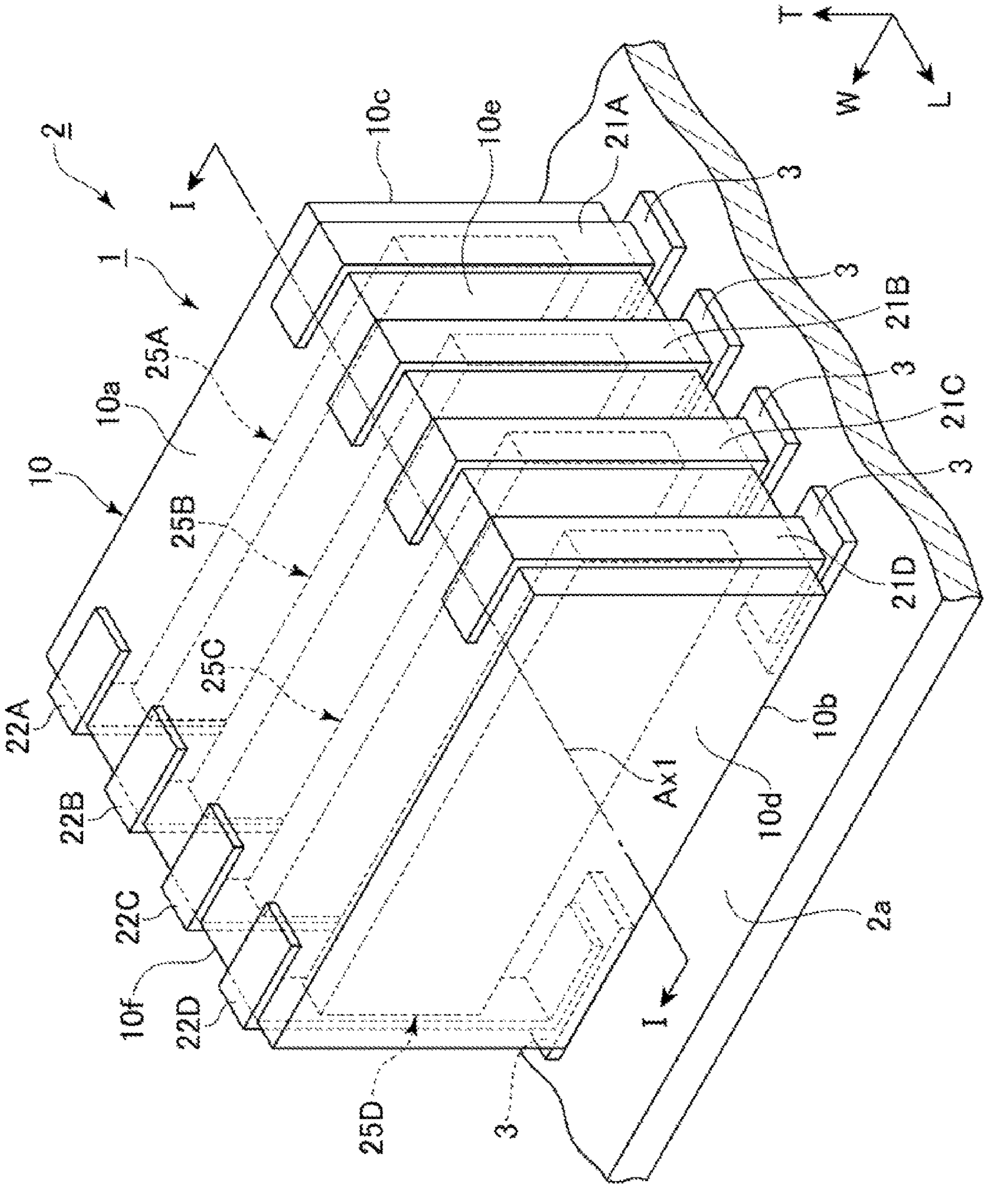
FIG. 1 is a perspective view of an inductor array according to one embodiment of the invention mounted on a mounting substrate.

Various embodiments of the present invention will be described hereinafter with reference to the appended drawings. Throughout the drawings, the same components are denoted by the same reference numerals. It should be noted that the drawings do not necessarily appear in accurate scales for convenience of description. The following embodiments of the present invention do not limit the scope of the claims. The elements described in the following embodiments are not necessarily essential to solve the problem addressed by the invention.

Figure 2:
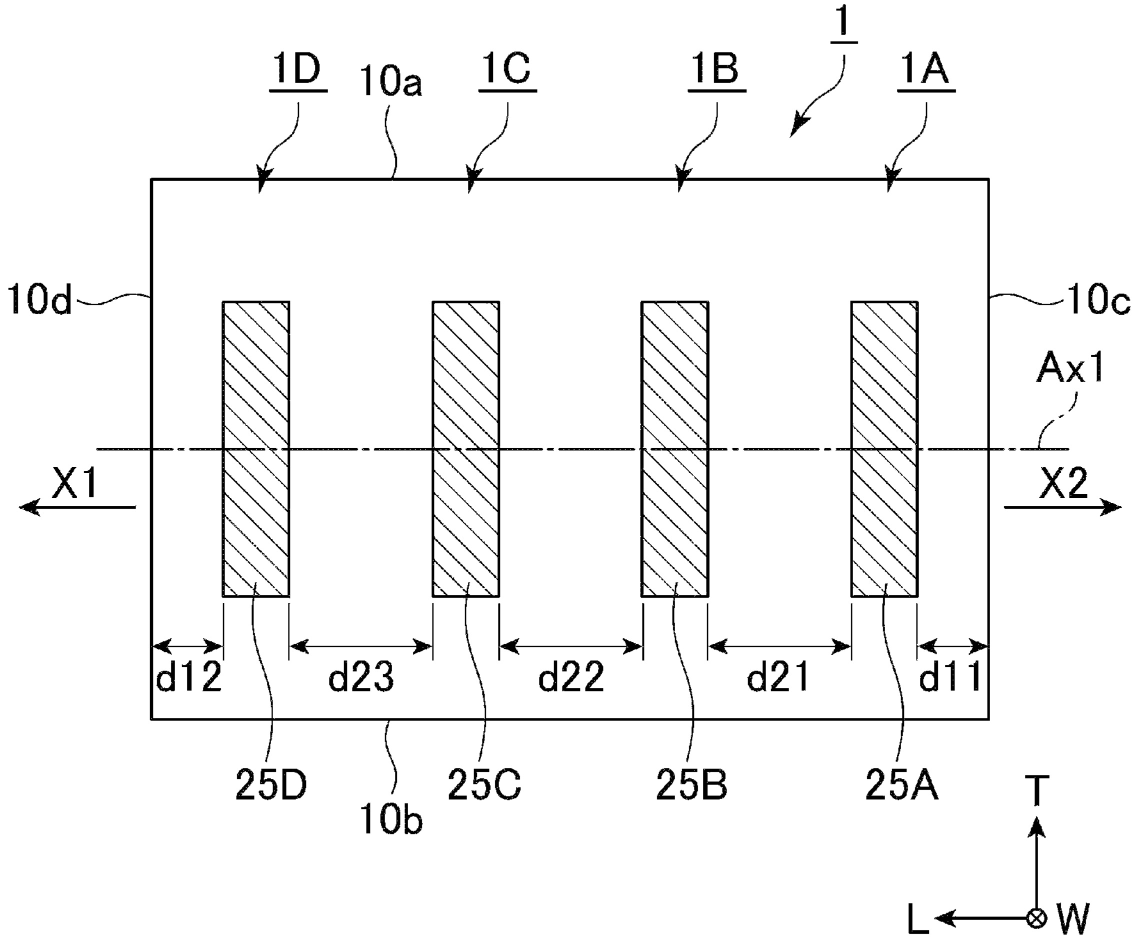
FIG. 2 is a schematic sectional view of the inductor array of FIG. 1 along the I-I line.
Figure 3:
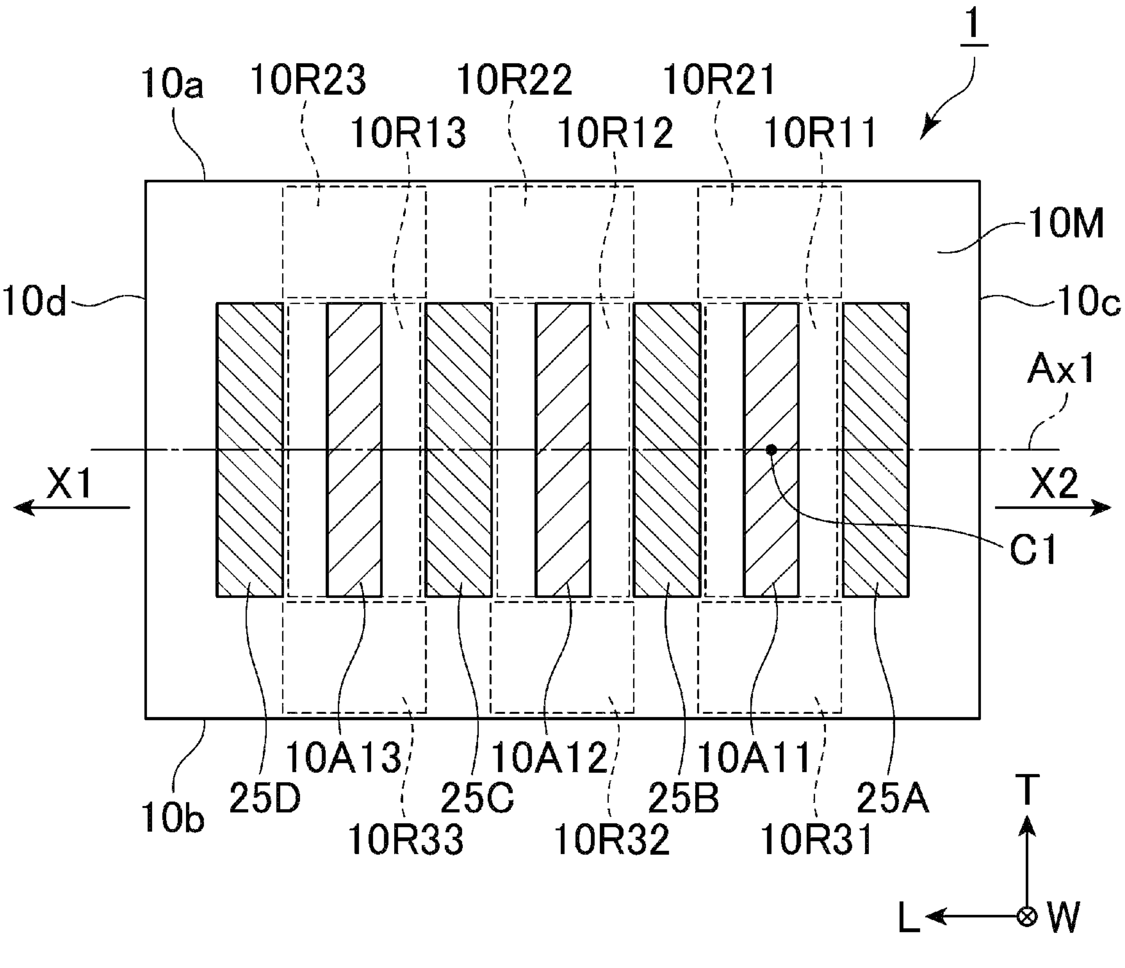
FIG. 3 is a schematic sectional view of the inductor array of FIG. 1 along the I-I line, showing a plurality of separate regions of the magnetic base body.

An inductor array 1 according to one or more embodiments of the present invention will be described with reference to FIGS. 1 to 3. FIG. 1 is a perspective view of an inductor array 1 according to one embodiment of the invention, and FIGS. 2 and 3 are schematic sectional views of the inductor array 1 along the I-I line. FIG. 2 will be used to explain the arrangement of internal conductors, and FIG. 3 will be used to explain the regions included in the base body.

Each of the drawings shows the L axis, the W axis, and the T axis orthogonal to one another. In this specification, the "length" direction, the "width" direction, and the "thickness" direction of the inductor array 1 are referred to as the L-axis direction, W-axis direction, and T-axis direction in FIG. 1, respectively, unless otherwise construed from the context.

As shown, the inductor array 1 includes a base body 10, a plurality of internal conductors provided in the base body 10, and a plurality of external electrodes connected to the plurality of internal conductors at respective ends thereof. The internal conductors are spaced apart from each other in the L-axis direction. In the illustrated embodiment, the base body 10 contains an internal conductor 25A, an internal conductor 25B, an internal conductor 25C, and an internal conductor 25D arranged in this order from the negative side to the positive side in the L-axis direction. The number of internal conductors disposed in the base body 10 is not limited to four. The base body 10 may contain any desired number of internal conductors.

The inductor array 1 includes external electrodes, the number of which is determined by the number of internal conductors provided in the base body 10. In the illustrated embodiment, the inductor array 1 includes the four internal conductors 25A to 25D each having opposite ends, and thus the inductor array 1 includes eight external electrodes 21A, 21B, 21C, 21D, 22A, 22B, 22C, 22D each connected to one of the ends. Specifically, the internal conductor 25A is connected to the external electrode 21A at one end thereof and to the external electrode 22A at the other end thereof. Similarly, the internal conductors 25B, 25C, 25D are respectively connected to the external electrodes 21B, 21C, 21D at one end thereof and to the external electrodes 22B, 22C, 22D at the other end thereof.

As configured above, the inductor array 1 includes an inductor 1A including the internal conductor 25A and the external electrodes 21A and 22A, an inductor 1B including the internal conductor 25B and the external electrodes 21B and 22B, an inductor 1C including the internal conductor 25C and the external electrodes 21C and 22C, and an inductor 1D including the internal conductor 25D and the external electrodes 21D and 22D.

The inductor array 1 is used in, for example, a large-current circuit through which a large electric current flows. More specifically, the inductor array 1 may be an inductor used in a DC-to-DC converter.

The inductor array 1 may be mounted on a mounting substrate 2*a*. The mounting substrate 2*a* has eight lands 3 provided thereon. The eight external electrodes 21A to 21D and 22A to 22D of the inductor array 1 are arranged to face the corresponding lands 3 when the inductor array 1 is mounted on the mounting substrate 2*a*. The inductor array 1 may be mounted on the mounting substrate 2*a* by soldering the external electrodes 21A to 21D and 22A to 22D to the corresponding lands 3. Thus, a circuit board 2 includes the inductor array 1 and the mounting substrate 2*a* on which the inductor array 1 is mounted. In addition to the inductor array 1, various electronic components may be mounted on the mounting substrate 2*a*.

The circuit board 2 can be installed in various electronic devices. Electronic devices in which the circuit board 2 may be installed include smartphones, tablets, game consoles, servers, electrical components of automobiles, and various other electronic devices. The inductor array 1 may be a built-in component embedded in the mounting substrate 2*a*.

As formed as a single chip including four inductors, or the inductors 1A, 1B, 1C, and 1D, the inductor array 1 is particularly suitable for small electronic devices that require high-density mounting of electronic components.

In the illustrated embodiment, the base body 10 has a substantially rectangular parallelepiped shape. In one embodiment of the invention, the base body 10 has a length (the dimension in the L-axis direction) of 0.6 mm to 10 mm, a width (the dimension in the W-axis direction) of 0.2 mm to 10 mm, and a thickness (the dimension in the T-axis direction) of 0.2 mm to 10 mm. A region of the base body 10 containing a single inductor has a dimension in the L-axis direction of 0.15 mm to 5.0 mm. The dimensions of the base body 10 are not limited to those specified herein. The term "rectangular parallelepiped" or "rectangular parallelepiped shape" used herein is not intended to mean solely "rectangular parallelepiped" in a mathematically strict sense.

The base body 10 has a first principal surface 10*a*, a second principal surface 10*b*, a first end surface 10*c*, a second end surface 10*d*, a first side surface 10*e*, and a second side surface 10*f*. These six surfaces define the outer periphery of the base body 10. The first principal surface 10*a* and the second principal surface 10*b* are opposed to each other, the first end surface 10*c* and the second end surface 10*d* are opposed to each other, and the first side surface 10*e* and the second side surface 10*f* are opposed to each other. Based on the position of the mounting substrate 2*a*, the first principal surface 10*a* lies on the top side of the base body 10, and therefore, the first principal surface 10*a* may be herein referred to as the "top surface," and the second principal surface 10*a* may be herein referred to as the "bottom surface." Each of the first principal surface 10*a*, the second principal surface 10*b*, the first side surface 10*e*, and the second side surface 10*f* connects the first end surface 10*c* to the second end surface 10*d*.

The inductor array 1 is disposed such that the first principal surface 10*a* or the second principal surface 10*b* faces the mounting substrate 2*a*. One of the principal surfaces that faces the mounting substrate 2*a*, either the first principal surface 10*a* or the second principal surface 10*b*, is herein referred to as a "mounting surface". In the illustrated embodiment, the second principal surface 10*b* faces the mounting substrate 2*a*, so the second principal surface 10*b* is the "mounting surface". Thus, the second principal surface 10*b* may also be referred to as the "mounting surface 10*b*". Since the "mounting surface" of the base body 10 is the surface facing the mounting substrate 2*a*, any surface other than the second principal surface 10*b* may be the mounting surface. The external electrodes 21A, 21B, 21C, 21D, 22A, 22B, 22C, and 22D provided in the inductor array 1 at least partially contact the mounting surface of the base body 10. In the embodiment shown in FIG. 1, the external electrodes 21A, 21B, 21C, 21D, 22A, 22B, 22C, and 22D are each partially in contact with the first and second principal surfaces 10*a* and 10*b*, so either the first principal surface 10*a* or the second principal surface 10*b* can be used as the mounting surface.

In the illustrated embodiment, the first and second principal surfaces 10*a* and 10*b* are parallel to the LW plane, the first and second end surfaces 10*c* and 10*d* are parallel to the WT plane, and the first and second side surfaces 10*e* and 10*f* are parallel to the TL plane.

The top-bottom direction of the inductor array 1 refers to the top-bottom direction in FIG. 1. The thickness direction of the inductor array 1 or the base body 10 may be the direction perpendicular to at least one of the top surface 10*a* or the mounting surface 10*b*. The length direction of the inductor array 1 or the base body 10 may be the direction perpendicular to at least one of the first end surface 10*c* or the second end surface 10*d*. The width direction of the inductor array 1 or the base body 10 may be the direction perpendicular to at least one of the first side surface 10*e* or the second side surface 10*f*. The width direction of the inductor array 1 or the base body 10 may be the direction perpendicular to the thickness and length directions of the inductor array 1 or the base body 10.

The following describes how the surfaces defining the base body 10 are related to the external electrodes. The external electrodes 21A to 21D, 22A to 22D are in contact at least with the mounting surface 10*b*, from among the surfaces of the base body 10, as they need to be connected to the mounting substrate 2*a*. The external electrodes 21A to 21D, 22A to 22D may be in contact with other surface of the base body 10 than the mounting surface 10*b*. In the illustrated embodiment, the external electrodes 21A to 21D are in contact with the mounting surface 10*b*, the first side surface 10*e*, and the top surface 10*a* of the base body 10, and the external electrodes 22A to 22D are in contact with the mounting surface 10*b*, the second side surface 10*f*, and the top surface 10*a* of the base body 10. The external electrodes 21A to 21D may be provided on the base body 10 such that they are in contact with the mounting surface 10*b* and the first side surface 10*e* but not with the top surface 10*a*. The external electrodes 22A to 22D may be provided on the base body 10 such that they are in contact with the mounting surface 10*b* and the second side surface 10*f* but not with the top surface 10*a*. The shape and arrangement of the external electrodes 21A to 21D, 22A to 22D are not limited to those explicitly described herein. The external electrodes 21A to 21D, 22A to 22D may have either the same shape or different shapes.

The base body 10 is made of a magnetic material. The magnetic material may be a ferrite material, a soft magnetic alloy material, a composite material including magnetic particles dispersed in a resin, or any other known magnetic materials. The ferrite material used for the base body 10 may be a Ni—Zn-based ferrite, a Ni—Zn—Cu-based ferrite, a Mn—Zn-based ferrite, or any other ferrite materials.

The metal magnetic particles contained in the magnetic material for the base body 10 are, for example, particles of (1) a metal such as Fe or Ni, (2) a crystalline alloy such as an Fe—Si—Cr alloy, an Fe—Si—Al alloy, or an Fe—Ni alloy, (3) an amorphous alloy such as an Fe—Si—Cr—B—C alloy or an Fe—Si—Cr—B alloy, or (4) a mixture thereof. The composition of the metal magnetic particles contained in the base body 10 is not limited to those described above. For example, the metal magnetic particles contained in the base body 10 may be particles of a Co—Nb—Zr alloy, an Fe—Zr—Cu—B alloy, an Fe—Si—B alloy, an Fe—Co—Zr—Cu—B alloy, an Ni—Si—B alloy, or an Fe—Al—Cr alloy. The Fe-based metal magnetic particles contained in the base body 10 may contain 80 wt % or more Fe. An insulating film may be formed on the surface of each of the metal magnetic particles. The insulating film may be an oxide film made of an oxide of the above metals or alloys. The insulating film provided on the surface of each of the metal magnetic particles may be, for example, a silicon oxide film provided by the sol-gel coating process.

In one or more embodiments, the average particle size of the metal magnetic particles in the base body 10 is from 1.0 μm to 20 μm. The average particle size of the metal magnetic particles contained in the base body 10 may be smaller than 1.5 μm or larger than 20 μm. The base body 10 may contain two or more types of metal magnetic particles having different average particle sizes.

In the base body 10, the metal magnetic particles may be bonded to each other with an oxide film formed by oxidation of an element included in the metal magnetic particles during a manufacturing process. The base body 10 may contain a binder in addition to the metal magnetic particles. When the base body 10 contains a binder, the metal magnetic particles are bonded to each other by the binder. The binder in the base body 10 may be formed, for example, by curing a thermosetting resin that has an excellent insulation property. Examples of a material for such a binder include an epoxy resin, a polyimide resin, a polystyrene (PS) resin, a high-density polyethylene (HDPE) resin, a polyoxymethylene (POM) resin, a polycarbonate (PC) resin, a polyvinylidene fluoride (PVDF) resin, a phenolic resin, a polytetrafluoroethylene (PTFE) resin, or a polybenzoxazole (PB 0) resin.

In one or more embodiments of the invention, the base body 10 contains a plurality of regions having different relative permeabilities.

In one or more embodiments of the invention, the internal conductors 25A to 25D have the same shape. In the illustrated embodiment, the internal conductors 25A to 25D have the same rectangular parallelepiped shape. Since the internal conductors 25A to 25D have the same shape, the inductor array 1 can easily achieve uniform electrical characteristics among the lines (i.e., the inductors 1A to 1D) formed therein. The internal conductors 25A to 25D, provided within the base body 10, may be placed at the same level in the T-axis direction. Specifically, as shown in FIG. 2, the internal conductors 25A to 25D are at the same level in the T-axis direction such that their respective top surfaces are at the same level in the T-axis direction and their respective bottom surfaces are at the same level in the T-axis direction. As used herein, any differences in shape between the internal conductors 25A to 25D may be attributable to the manufacturing- and/or measurement-induced errors, but this does not deny that the internal conductors 25A to 25D have the same shape.

As shown, the internal conductors 25A to 25D may extend linearly from the first side surface 10*e* to the second side surface 10*f* in plan view (as viewed in the T-axis direction). The internal conductors 25A to 25D can be shaped in any other manners than the illustrated such that they have winding portions, as will be described below. The other possible shapes of the internal conductors 25A to 25D will be described below.

In the illustrated embodiment, the internal conductors 25A to 25D are exposed at one end thereof to the outside of the base body 10 from the first side surface 10*e* and are connected to the external electrodes 21A to 21D, respectively, at the one end. The internal conductors 25A to 25D are also exposed at the other end thereof to the outside of the base body 10 from the second side surface 10*f* and are connected to the external electrodes 22A to 22D, respectively, at the other end. In this way, to connect the internal conductors 25A to 25D to the external electrodes, the internal conductors 25A to 25D are not exposed through the mounting surface, but are connected, outside the base body 10, to the mounting surface via the external electrodes 21A, 22A, 21B, 22B, 21C, 22C, 21D, 22D formed on the first and second side surfaces 10*e* and 10*f*. In this manner, the volume of the base body 10 can account for a larger part in the overall volume of the inductor array 1. Consequently, the proportion in volume of the base body 10, which is made of a magnetic material, can be larger in the inductor array 1. This can result in higher saturation magnetic flux density of the base body 10.

FIG. 1 shows a reference axis Ax1 extending along the L-axis, which is an imaginary axis extending through the first and second end surfaces 10*c* and 10*d*. The internal conductors 25A to 25D are arranged along the reference axis Ax1. In the direction perpendicular to the reference axis Ax1, the internal conductors 25A to 25D extend from the first side surface 10*e* to the second side surface 10*f*.

The following further describes how the internal conductors 25A to 25D are arranged, mainly with reference to FIG. 2. FIG. 2 schematically shows a section of the inductor array 1 along the I-I line. For brevity of explanation, FIG. 3 does not show the external electrodes 21A to 21D, 22A to 22D.

As shown in FIG. 2, the internal conductors 25A to 25D are arranged along the reference axis Ax1. FIG. 2 shows a first direction X1 and a second direction X2. As used herein, the first direction X1 denotes the direction extending along the reference axis Ax1 from the first end surface 10*c* toward the second end surface 10*d*, and the second direction X2 denotes the reversed direction (i.e., the direction extending along the reference axis Ax1 from the second end surface 10*d* toward the first end surface 10*c*). The first and second directions X1 and X2 are referred to describe how the components of the inductor array 1 are arranged.

The internal conductor 25A is in the base body 10 and adjacent to the first end surface 10*c*. More specifically, the internal conductor 25A is positioned away from the first end surface 10*c* by a distance d11 in the first direction X1. The internal conductor 25B, which is adjacent to the internal conductor 25A, is positioned away from the internal conductor 25A by a distance d21 in the first direction X1. The internal conductor 25C, which is adjacent to the internal conductor 25B, is positioned away from the internal conductor 25B by a distance d22 in the first direction X1. The internal conductor 25D, which is adjacent to the internal conductor 25C and the second end surface 10*d*, is positioned away from the internal conductor 25C by a distance d23 in the first direction X1 and positioned away from the second end surface 10*d* by a distance d12 in the second direction X2. Since the distance d11 indicates the distance between the first end internal conductor 25A and the first end surface 10*c*, the distance d11 may be herein referred to as the first end distance d11. Similarly, since the distance d12 indicates the distance between the second end internal conductor 25D and the second end surface 10*d*, the distance d12 may be herein referred to as the second end distance d12. Further, since the distances d21, d22, d23 indicate distances between internal conductors, the distances d21, d22, d23 may be herein referred to as the inter-conductor distances d21, d22, d23.

The internal conductors 25A to 25D may be arranged at even intervals in the direction along the reference axis Ax1 in the base body 10. In this case, the internal conductors 25A to 25D are arranged at the center of the inductors 1A to 1D, respectively, in the direction extending along the reference axis Ax1. Therefore, the relation d11=d12=d21/2=d22/2=d23/2 is established. Since the internal conductors 25A to 25D are arranged at even intervals in the direction along the reference axis Ax1, the magnetic flux generated from the internal conductors 25A to 25D can be distributed more evenly in the base body 10.

The following describes the relative permeabilities of several portions of the base body 10 with reference to FIG. 3. The base body 10 may be partitioned into a plurality of regions. For example, the regions of the base body 10 between the internal conductors embedded in the base body 10 may be referred to as the inter-conductor regions. Specifically, the regions of the base body 10 between adjacent ones of the internal conductors 25A to 25D are referred to as the inter-conductor regions. More specifically, as shown in FIG. 3, the region of the base body 10 between the internal conductor 25A and the internal conductor 25B is referred to as the inter-conductor region 10R11, the region between the internal conductor 25B and the internal conductor 25C is referred to as the inter-conductor region 10R12, and the region between the internal conductor 25C and the internal conductor 25D is referred to as the inter-conductor region 10R13. In the case where the base body 10 includes five or more internal conductors, the base body 10 may include four or more inter-conductor regions.

Further, the regions of the base body 10 between the top surface 10*a* and the inter-conductor regions 10R11 to 10R13 may be referred to as the upper margin regions 10R21 to 10R23, and the regions between the bottom surface 10*b* and the inter-conductor regions 10R11 to 10R13 may be referred to as the lower margin regions 10R31 to 10R33.

In one or more embodiments of the invention, the base body 10 may include a first high-permeability portion that occupies at least a part of the inter-conductor regions. In the case where the base body 10 includes a plurality of inter-conductor regions, the first high-permeability portion may be positioned in at least one of the plurality of inter-conductor regions. In the illustrated embodiment, the first high-permeability portion is positioned in each of the inter-conductor regions 10R11 to 10R13. Specifically, a high-permeability portion 10A11 is positioned in the inter-conductor region 10R11, a high-permeability portion 10A12 is positioned in the inter-conductor region 10R12, and a high-permeability portion 10A13 is positioned in the inter-conductor region 10R13. The high-permeability portions 10A11 to 10A13 are an example of the "first high-permeability portion" recited in the claims.

In the illustrated embodiment, the portion of the base body 10 other than the high-permeability portions 10A11 to 10A13 is a body portion 10M. Each of the internal conductors 25A to 25D is embedded in the body portion 10M and supported by the body portion 10M. In the embodiment shown in FIG. 3, the body portion 10M interposes between each of the internal conductors 25A to 25D and the top surface 10*a* of the base body 10. Likewise, the body portion 10M interposes between each of the internal conductors 25A to 25D and the bottom surface 10*b* of the base body 10. Further, the body portion 10M also interposes between the first end surface 10*c* and the internal conductor 25A and between the second end surface 10*d* and the internal conductor 25B. The high-permeability portions 10A11 to 10A13 have a higher relative permeability than the body portion 10M. When the high-permeability portions 10A11 to 10A13 and the body portion 10M are made of a ferrite, the relative permeabilities of these members can be adjusted by the composition of the ferrite. For example, when the body portion 10M is made of a Ni—Zn-based ferrite, the high-permeability portions 10A11 to 10A13 can be made of a Ni—Zn-based ferrite having a lower Ni/Zn ratio than the Ni—Zn-based ferrite of the body portion 10M, such that the relative permeability of the high-permeability portions 10A11 to 10A13 is higher than that of the body portion 10M. When the high-permeability portions 10A11 to 10A13 and the body portion 10M are made of a soft magnetic metal material, the relative permeabilities of these members can be adjusted by the content of iron in the soft magnetic metal material. The relative permeabilities of the high-permeability portions 10A11 to 10A13 and the body portion 10M can be adjusted by the particle size of the metal magnetic particles contained in these members. For example, the metal magnetic particles contained in the high-permeability portions 10A11 to 10A13 can have a larger average particle size than the metal magnetic particles contained in the body portion 10M, such that the relative permeability of the high-permeability portions 10A11 to 10A13 is higher than that of the body portion 10M. Using other methods known to those skilled in the art, the relative permeability of the high-permeability portions 10A11 to 10A13 can be adjusted to be higher than that of the body portion 10M.

In one or more embodiments of the invention, the relative permeability of the body portion 10M is, for example, 20 to 60, and the relative permeability of the high-permeability portions 10A11 to 10A13 is 40 to 100 (and higher than the relative permeability of the body portion 10M). When the inductor array 1 is used in a high frequency circuit, the relative permeability of the base body 10 may be lower. For example, when the inductor array 1 operates at a frequency of about 100 MHz, the lower limit of the relative permeability of the body portion 10M may be 20 or higher. When the entire region of the base body 10 has a relative permeability of 100 or lower, it is possible to reduce the chance of magnetic saturation. Therefore, there is no need to provide a magnetic gap in the base body 10 to improve the DC superposition characteristics.

Since the high-permeability portions are thus disposed in the inter-conductor regions, the magnetic flux generated upon variation of electric current flowing through one of the internal conductors is likely to pass through the high-permeability portions and thus is less likely to pass through the magnetic paths surrounding the other internal conductors. Therefore, since a high-permeability portion is disposed in an inter-conductor region between one internal conductor and another internal conductor adjacent thereto, the magnetic coupling between the adjacent internal conductors can be lessened. In other words, the coupling coefficient between the adjacent internal conductors can be reduced. For example, in the example shown in FIG. 3, the high-permeability portion 10A11 is disposed in the inter-conductor region 10R11 between the internal conductor 25A and the internal conductor 25B, and therefore, the magnetic flux generated upon variation of the electric current flowing through the internal conductor 25A is likely to pass through the magnetic path extending through the high-permeability portion 10A11 and is less likely to pass through the magnetic path surrounding the other internal conductors (particularly the internal conductor 25B). Therefore, the coupling coefficient between the internal conductor 25A and the other internal conductors can be reduced.

In the embodiment shown in FIG. 3, as viewed from the direction of the reference axis Ax1, the high-permeability portion 10A11 is configured and positioned to cover the entirety of the internal conductors 25A, 25B. With this configuration, any straight line drawn from the outer surface of the internal conductor 25A facing toward the internal conductor 25B to the outer surface of the internal conductor 25B facing toward the internal conductor 25A passes through the high-permeability portion 10A11. Likewise, as viewed from the direction of the reference axis Ax1, the high-permeability portion 10A12 is configured and positioned to cover the entirety of the internal conductors 25B, 25C, and the high-permeability portion 10A13 is configured and positioned to cover the entirety of the internal conductors 25C, 25D. Since the high-permeability portions 10A11 to 10A13 are configured and positioned to cover the entirety of the adjacent internal conductors as viewed from the direction of the reference axis Ax1, the coupling coefficient between each of the internal conductors 25A to 25D and the other internal conductors can be reduced.

The high-permeability portions contained in the base body 10 are positioned in the base body 10 so as to occupy at least a part of the inter-conductor regions. In the embodiment shown in FIG. 3, the high-permeability portion 10A11 is spaced apart from each of the internal conductor 25A and the internal conductor 25B in the direction of the reference axis Ax1. Therefore, the high-permeability portion 10A11 occupies only a part of the inter-conductor region 10R11.

Likewise, in the embodiment shown in FIG. 3, the high-permeability portion 10A12 occupies only a part of the inter-conductor region 10R12, and the high-permeability portion 10A13 occupies only a part of the inter-conductor region 10R13.

Figure 4:
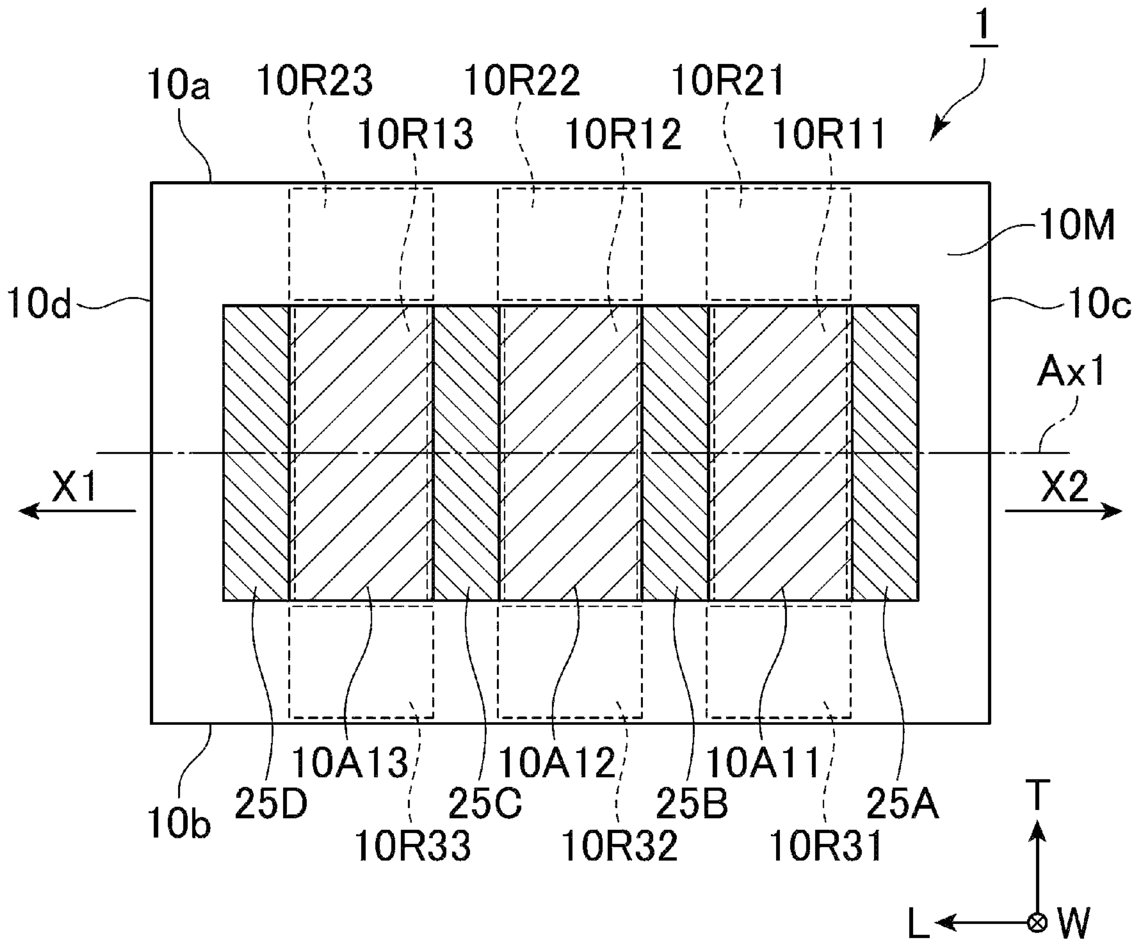
FIG. 4 is a sectional view schematically showing a section of an inductor array according to another embodiment of the present invention.

Modifications of the high-permeability portions 10A11 to 10A13 will be hereinafter described with reference to FIG. 4. In the embodiment shown in FIG. 3, each of the high-permeability portions 10A11 to 10A13 is spaced apart from the adjacent internal conductors. For example, the high-permeability portion 10A11 is spaced apart from both of the internal conductor 25A and the internal conductor 25B. In the embodiment shown in FIG. 4, the high-permeability portions 10A11 to 10A13 occupy the entirety of the inter-conductor regions 10R11 to 10R13, which contain the high-permeability portions 10A11 to 10A13, respectively. As a result, the high-permeability portions 10A11 to 10A13 are positioned to contact adjacent internal conductors. For example, the high-permeability portion 10A11 is in contact with the internal conductor 25A and the internal conductor 25B both adjacent thereto. Each of the high-permeability portions 10A11 to 10A13 may be in contact with at least one of the adjacent internal conductors. For example, the high-permeability portion 10A11 may be in contact with only one of the internal conductor 25A and the internal conductor 25B both adjacent thereto and may be spaced apart from the other. When each of the high-permeability portions 10A11 to 10A13 is thus configured and positioned to contact one of the adjacent internal conductors, the magnetic flux generated from an internal conductor that is contacted by one of the high-permeability portions 10A11 to 10A13 is likely to pass through the high-permeability portion that is in contact with the internal conductor. Therefore, the coupling coefficient between each of the internal conductors 25A to 25D and other internal conductors can be further reduced.

In one or more embodiments of the present invention, each of the high-permeability portions extends in the direction of the reference axis Ax1 over an intermediate point between the adjacent internal conductors in the direction of the reference axis Ax1. FIG. 3 shows the intermediate point C1 between the internal conductor 25A and the internal conductor 25B. For example, the intermediate point between the internal conductor 25A and the internal conductor 25B may be the middle point of the line segment extending along the reference axis Ax1 one end of which is at the point of intersection between the reference axis Ax1 and the outer surface of the internal conductor 25A facing toward the internal conductor 25B and the other end of which is at the point of intersection between the reference axis Ax1 and the outer surface of the internal conductor 25B facing toward the internal conductor 25A. Since the high-permeability portion 10A11 extends in the direction of the reference axis Ax1 over the intermediate point C1, both the magnetic flux generated by the internal conductor 25A and the magnetic flux generated by the internal conductor 25B are likely to pass through the high-permeability portion 10A11. Therefore, the high-permeability portion 10A11 lessens the coupling between the internal conductor 25B and the other internal conductors as well as the coupling between the internal conductor 25A and the other internal conductors.

An inductor array according to another embodiment, to which the present invention is applicable, will be now described with reference to FIGS. 5 to 10.

Figure 5:
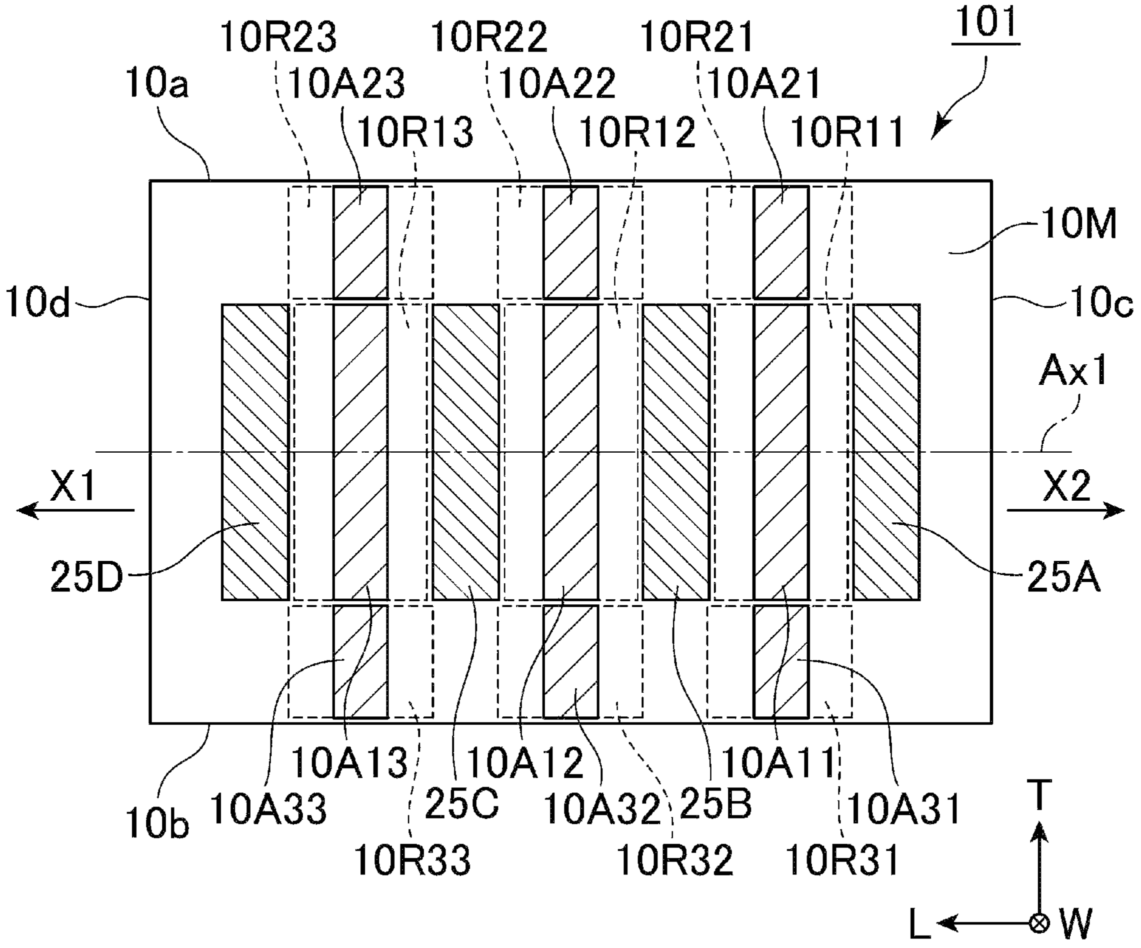
FIG. 5 is a sectional view schematically showing a section of an inductor array according to another embodiment of the present invention.

To begin with, an inductor array 101 according to another embodiment, to which the present invention is applicable, will be described with reference to FIG. 5. FIG. 5 is a sectional view of the inductor array 101 along a plane parallel to the LT plane. The inductor array 101 further includes high-permeability portions 10A21 to 10A23 disposed in the upper margin regions 10R21 to 10R23 and high-permeability portions 10A31 to 10A33 disposed in the lower margin regions 10R31 to 10R33. The high-permeability portions 10A21 to 10A23 and 10A31 to 10A33 are an example of the "second high-permeability portion" recited in the claims. In the embodiment shown in FIG. 5, the body portion 10M is the region of the base body 10 other than the high-permeability portions 10A11 to 10A13, the high-permeability portions 10A21 to 10A23, and the high-permeability portions 10A31 to 10A33. The following description does not mention the common features shared between the inductor arrays 101 and 1.

The high-permeability portions 10A21 to 10A23, 10A31 to 10A33 have a higher relative permeability than the body portion 10M. The relative permeability of the high-permeability portions 10A21 to 10A23, 10A31 to 10A33 is either the same as or different from that of the high-permeability portions 10A11 to 10A13. The high-permeability portions 10A21 to 10A23, 10A31 to 10A33 may be made of the same magnetic material as the high-permeability portions 10A11 to 10A13.

Each of the high-permeability portions 10A21 to 10A23 occupies at least a part of the associated one of the upper margin regions 10R21 to 10R23. Each of the high-permeability portions 10A21 to 10A23 may occupy the entirety of the associated one of the upper margin regions 10R21 to 10R23. Each of the high-permeability portions 10A31 to 10A33 occupies at least a part of the associated one of the lower margin regions 10R31 to 10R33. Each of the high-permeability portions 10A31 to 10A33 may occupy the entirety of the associated one of the lower margin regions 10R31 to 10R33.

In the inductor array 101, the body portion 10M interposes between each of the internal conductors 25A to 25D and the top surface 10*a* of the base body 10. Likewise, the body portion 10M interposes between each of the internal conductors 25A to 25D and the bottom surface 10*b* of the base body 10. With this configuration, it is possible to inhibit generation of magnetic flux passing through the magnetic paths surrounding adjacent internal conductors, as compared to the case where the high-permeability portions 10A21 to 10A23, 10A31 to 10A33 extend to the regions between each of the internal conductors 25A to 25D and the top surface 10*a* of the base body 10 and the regions between each of the internal conductors 25A to 25D and the bottom surface 10*b* of the base body 10.

The high-permeability portions 10A21 to 10A23, 10A31 to 10A33 is either integrated with or separate from associated one of the high-permeability portions 10A11 to 10A13. In the embodiment shown in FIG. 5, the high-permeability portion 10A11 is slightly spaced apart from each of the high-permeability portions 10A21, 10A31 that face the high-permeability portion 10A11 in the direction orthogonal to the reference axis Ax1 (T-axis direction). However, the high-permeability portion 10A11 may be integrated with at least one of the high-permeability portion 10A21 or the high-permeability portion 10A31. The high-permeability portions 10A11, 10A21, 10A31 integrated together can be readily made of a single magnetic sheet extending along the WT plane or magnetic sheets of the same type extending along the WT plane that are stacked in the L-axis direction. Thus integrating the high-permeability portions 10A11, 10A21, 10A31 simplifies the manufacturing process of the base body 10.

The high-permeability portion 10A11 is disposed in the inter-conductor region 10R11 between the internal conductor 25A and the internal conductor 25B, and therefore, the magnetic flux generated upon variation of the electric current flowing through the internal conductor 25A is likely to pass through the magnetic path extending through the high-permeability portion 10A11 and is less likely to pass through the magnetic path surrounding the other internal conductors (particularly the internal conductor 25B). Therefore, the coupling coefficient between the internal conductor 25A and the other internal conductors can be reduced.

Figure 6:
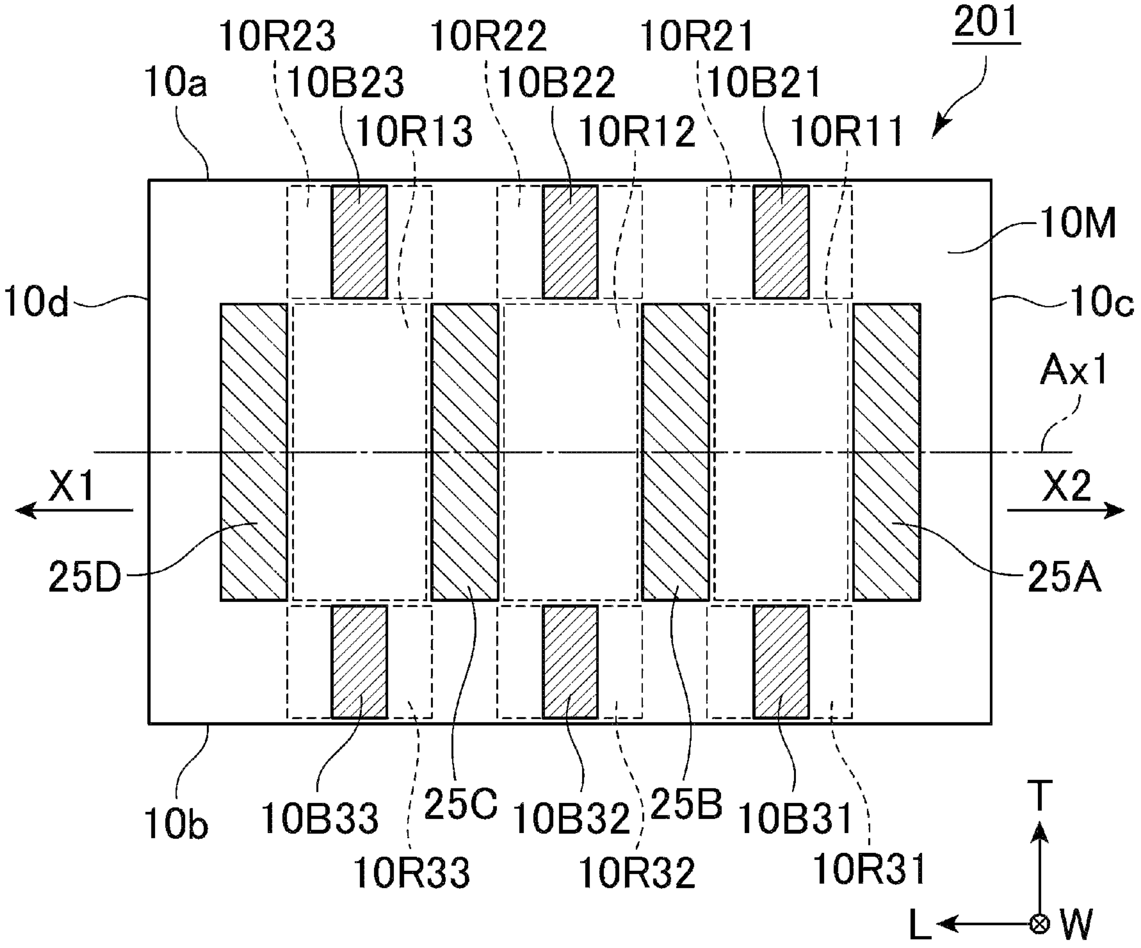
FIG. 6 is a sectional view schematically showing a section of an inductor array according to another embodiment of the present invention.

The following now describes an inductor array 201 according to another embodiment, to which the present invention is applicable, with reference to FIG. 6. FIG. 6 is a sectional view of the inductor array 201 along a plane parallel to the LT plane. The inductor array 201 is different from the inductor array 1 in that it includes low-permeability portions 10B21 to 10B23, 10B31 to 10B33 in place of the high-permeability portions 10A11 to 10A13. The low-permeability portions 10B21 to 10B23 and 10B31 to 10B33 are an example of the "first low-permeability portion" recited in the claims. In the embodiment shown in FIG. 6, the body portion 10M is the region of the base body 10 other than the low-permeability portions 10B21 to 10B23, 10B31 to 10B33. The following description does not mention the common features shared between the inductor arrays 201 and 1.

The low-permeability portions 10B21 to 10B23, 10B31 to 10B33 have a lower relative permeability than the body portion 10M. The relative permeability of the low-permeability portions 10B21 to 10B23, 10B31 to 10B33 is adjusted to be lower than the relative permeability of the body portion 10M by adjusting the composition of ferrite, the content of iron in the soft magnetic metal material, the size of the metal magnetic particles, and other parameters.

Each of the low-permeability portions 10B21 to 10B23 occupies at least a part of the associated one of the upper margin regions 10R21 to 10R23. Each of the low-permeability portions 10B21 to 10B23 may occupy the entirety of the associated one of the upper margin regions 10R21 to 10R23. Each of the low-permeability portions 10B31 to 10B33 occupies at least a part of the associated one of the lower margin regions 10R31 to 10R33. Each of the low-permeability portions 10B31 to 10B33 may occupy the entirety of the associated one of the lower margin regions 10R31 to 10R33.

The inductor array 201 includes the low-permeability portions 10B21 to 10B23 and 10B31 to 10B33 disposed in the upper margin regions 10R21 to 10R23 and the lower margin regions 10R31 to 10R33. In the inductor array 201, the magnetic flux generated from the internal conductors and flowing toward the internal conductors adjacent thereto needs to pass through the upper margin regions 10R21 to 10R23 and the lower margin regions 10R31 to 10R33. Since the low permeability portions 10B21 to 10B23 and 10B31 to 10B33, having a lower relative permeability than the body portion 10M, are disposed in the upper margin regions 10R21 to 10R23 and the lower margin regions 10R31 to 10R33, the magnetic flux generated from the internal conductors is less likely to pass through the magnetic paths surrounding the adjacent internal conductors. Thus, the magnetic coupling between adjacent internal conductors can be lessened in the inductor array 201. For example, upon variation of electric current flowing through the internal conductor 25A, it is possible to inhibit generation of magnetic flux passing through the magnetic paths surrounding the adjacent internal conductor 25B by the low-permeability portion 10B21 disposed in the upper margin region 10R21 and the low-permeability portion 10B31 disposed in the lower margin region 10R31.

The low-permeability portions 10B21 to 10B23 may extend from the top surfaces of the inter-conductor regions 10R11 to 10R13 to the top surface **10*a* of the base body 10. The low-permeability portions 10B31 to 10B33 may extend from the bottom surfaces of the inter-conductor regions 10R11 to 10R13 to the bottom surface 10*b* of the base body 10. Thus, the low-permeability portions 10B21 to 10B23 extend in the direction orthogonal to the reference axis Ax1 over the entirety of the regions between the top surface 10*a* of the base body 10 and the inter-conductor regions 10R11 to 10R13, and therefore, it is possible to inhibit generation of magnetic flux that passes through the magnetic paths passing through the upper regions of the inter-conductor regions 10R11 to 10R13 and surrounding the adjacent internal conductors. Likewise, the low-permeability portions 10B31 to 10B33 extend in the direction orthogonal to the reference axis Ax1 over the entirety of the regions between the bottom surface 10*b* of the base body 10 and the inter-conductor regions 10R11 to 10R13, and therefore, it is possible to further inhibit generation of magnetic flux that passes through the magnetic paths passing through the lower regions of the inter-conductor regions 10R11 to 10R13** and surrounding the adjacent internal conductors.

Figure 7:
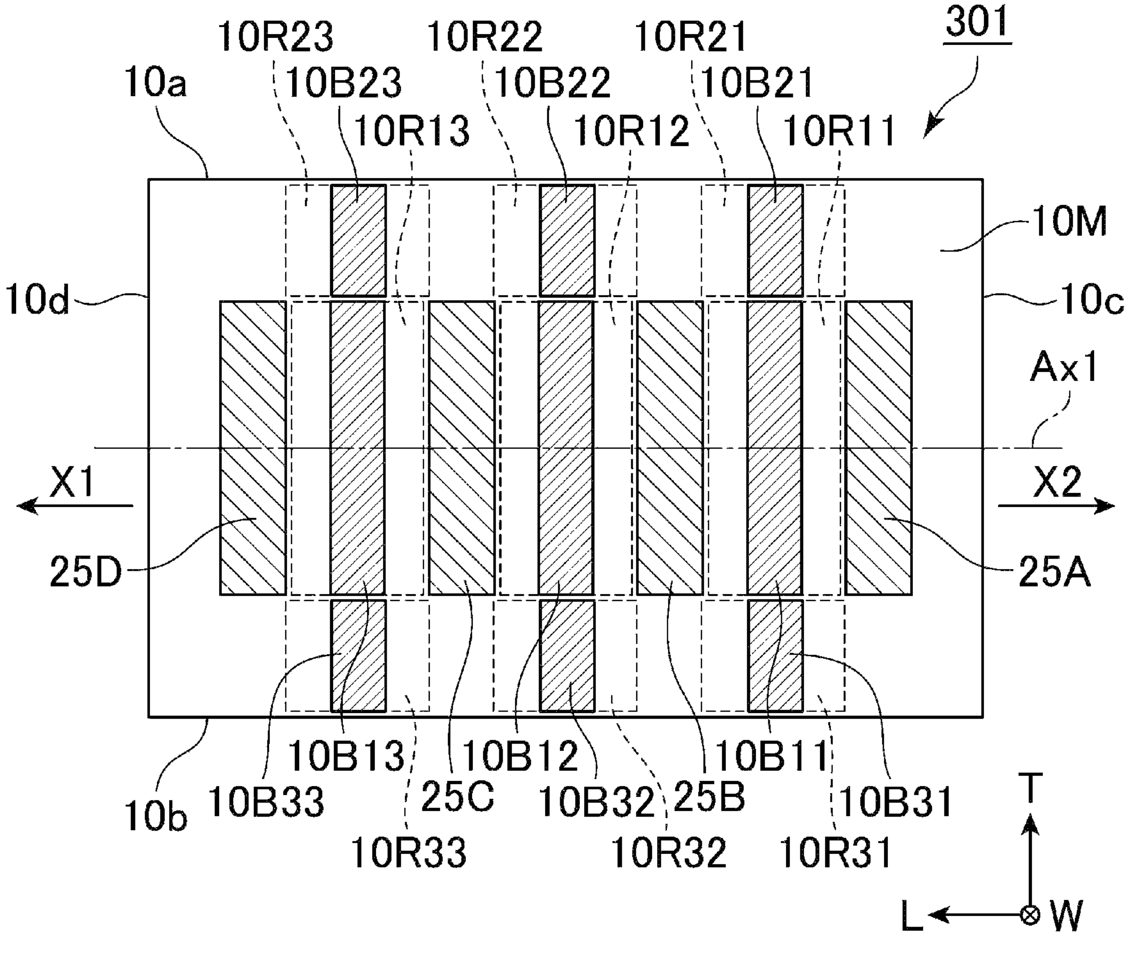
FIG. 7 is a sectional view schematically showing a section of an inductor array according to another embodiment of the present invention.

The following now describes an inductor array 301 according to another embodiment, to which the present invention is applicable, with reference to FIG. 7. FIG. 7 is a sectional view of the inductor array 301 along a plane parallel to the LT plane. The inductor array 301 further includes low-permeability portions 10B11 to 10B13 disposed in the inter-conductor regions 10R11 to 10R13. The low-permeability portions 10B11 to 10B13 are an example of the "second low-permeability portion" recited in the claims. In the embodiment shown in FIG. 7, the body portion 10M is the region of the base body 10 other than the low-permeability portions 10B11 to 10B13, 10B21 to 10B23, 10B31 to 10B33. The following description does not mention the common features shared between the inductor arrays 301 and 201.

The low-permeability portions 10B11 to 10B13 have a lower relative permeability than the body portion 10M. The relative permeability of the low-permeability portions 10B11 to 10B13 is either the same as or different from that of the low-permeability portions 10B21 to 10B23, 10B31 to 10B33. The low-permeability portions 10B11 to 10B13 may be made of the same magnetic material as the low-permeability portions 10B21 to 10B23, 10B31 to 10B33.

Each of the low-permeability portions 10B11 to 10B13 occupies a part of the associated one of the inter-conductor regions 10R11 to 10R13. Each of the low-permeability portions 10B11 to 10B13 is spaced apart from the adjacent internal conductors. For example, the low-permeability portion 10B11 is spaced apart from both of the internal conductor 25A and the internal conductor 25B. This arrangement allows the magnetic flux generated from each internal conductor to pass through the region between the internal conductor and the low-permeability portion (body portion 10M).

In the inductor array 301, the body portion 10M interposes between each of the internal conductors 25A to 25D and the top surface **10*a* of the base body 10. Likewise, the body portion 10M interposes between each of the internal conductors 25A to 25D and the bottom surface 10*b* of the base body 10. With this configuration, it is possible to improve electrical characteristics (such as inductance) of the inductors including the internal conductors 25A to 25D, as compared to the case where the low-permeability portions 10B21 to 10B23, 10B31 to 10B33 extend to the regions between each of the internal conductors 25A to 25D and the top surface 10***a* of the base body 10 and the regions between each of the internal conductors 25A to 25D and the bottom surface 10*b* of the base body 10.

In one or more embodiments of the invention, the relative permeability of the low-permeability portions 10B11 to 10B13 is one-half or less of the relative permeability of the body portion 10M. Since the relative permeability of the low-permeability portions 10B11 to 10B13 disposed in the inter-conductor regions 10R11 to 10R13 is one-half or less of the relative permeability of the body portion 10M, it is possible to further inhibit generation of magnetic flux that passes through the magnetic paths passing through the inter-conductor regions 10R11 to 10R13 and surrounding the adjacent internal conductors.

Figure 8:
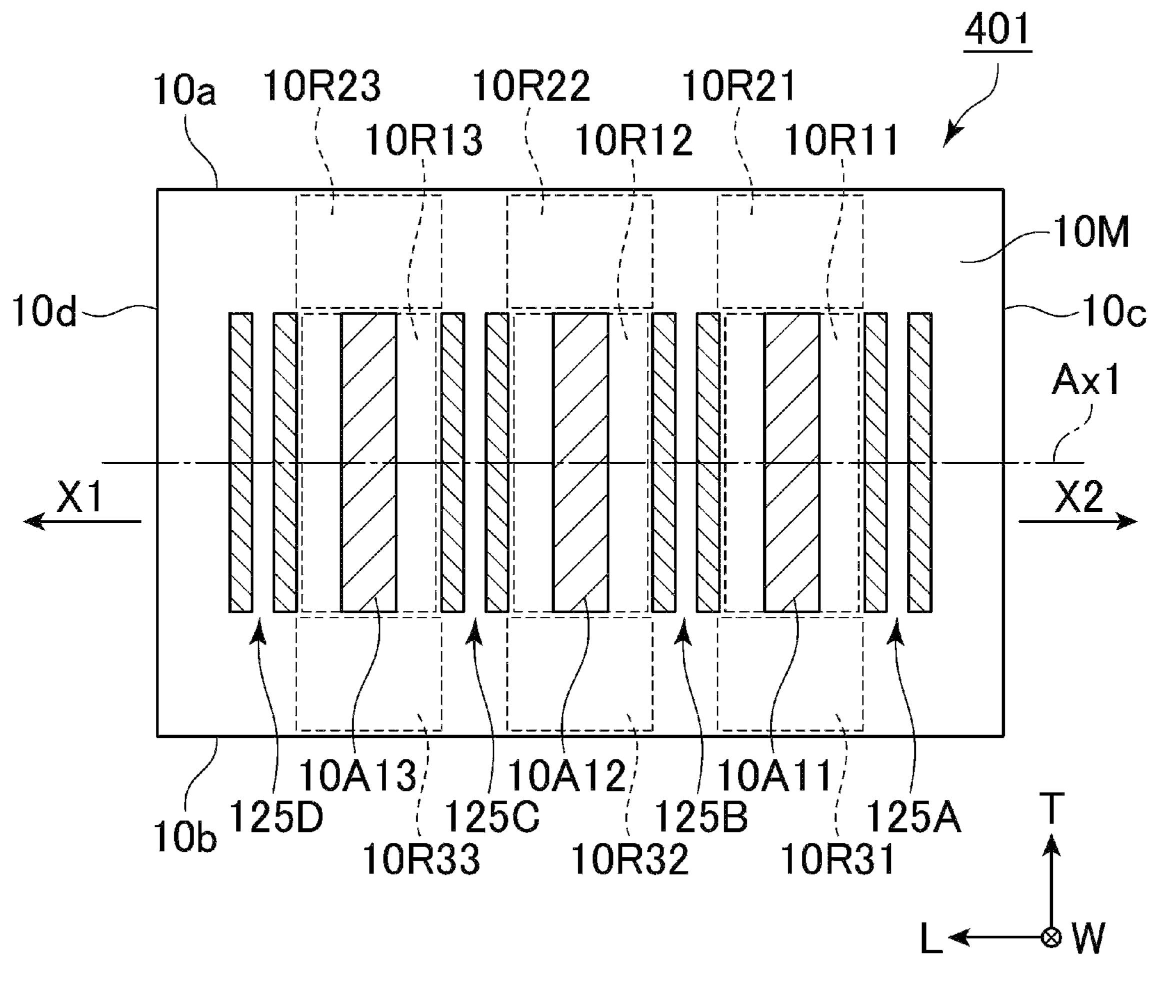
FIG. 8 is a sectional view schematically showing a section of an inductor array according to another embodiment of the present invention.

The following now describes an inductor array 401 according to another embodiment, to which the present invention is applicable, with reference to FIG. 8. FIG. 8 is a sectional view of the inductor array 401 along a plane parallel to the LT plane. The inductor array 401 is different from the inductor array 1 in that it includes internal conductors 125A to 125D, instead of the internal conductors 25A to 25D. The following description does not mention the common features shared between the inductor arrays 401 and 1.

As shown in FIG. 8, the internal conductor 125A has two layers of conductor patterns stacked in the L-axis direction. Each of the two layers of conductor patterns constituting the internal conductor 125A is connected at one end thereof to the external electrode 21A and at the other end thereof to the external electrode 22A. One of the two layers of conductor patterns constituting the internal conductor 125A may be at least partially in contact with the other of the two layers of conductor patterns within the base body 10. The internal conductor 125A may be made of three or more conductor patterns stacked in the L-axis direction. The internal conductors 125B to 125D have two or more layers of conductor patterns stacked in the L-axis direction, as with the internal conductor 125A.

The region of the base body 10 between the internal conductor 125A and the internal conductor 125B is the inter-conductor region 10R11, the region between the internal conductor 125B and the internal conductor 125C is the inter-conductor region 10R12, and the region between the internal conductor 125C and the internal conductor 125D is the inter-conductor region 10R13. As in the inductor array 1, the high-permeability portions 10A11 to 10A13 are disposed in the inter-conductor regions 10R11 to 10R13, respectively.

In the inductor array 401 configured as described above, the high-permeability portions 10A11 to 10A13 disposed in the inter-conductor regions lessen the coupling between the internal conductors 125A to 125D disposed in the base body 10.

As with the inductor array 101, the inductor array 401 may include, in addition to the high-permeability portions 10A11 to 10A13, the high-permeability portions 10A21 to 10A23, 10A31 to 10A33 in at least one of the upper margin regions 10R21 to 10R23 and the lower margin regions 10R31 to 10R33. The high-permeability portions 10A21 to 10A23, 10A31 to 10A33 further lessen the coupling between the internal conductors 125A to 125D.

The internal conductors 125A to 125D may be substituted for the internal conductors 25A to 25D in the inductor arrays 201, 301. In other words, the inductor array 201 may include the internal conductors 125A to 125D instead of the internal conductors 25A to 25D. Also, the inductor array 301 may include the internal conductors 125A to 125D instead of the internal conductors 25A to 25D.

Figure 9:
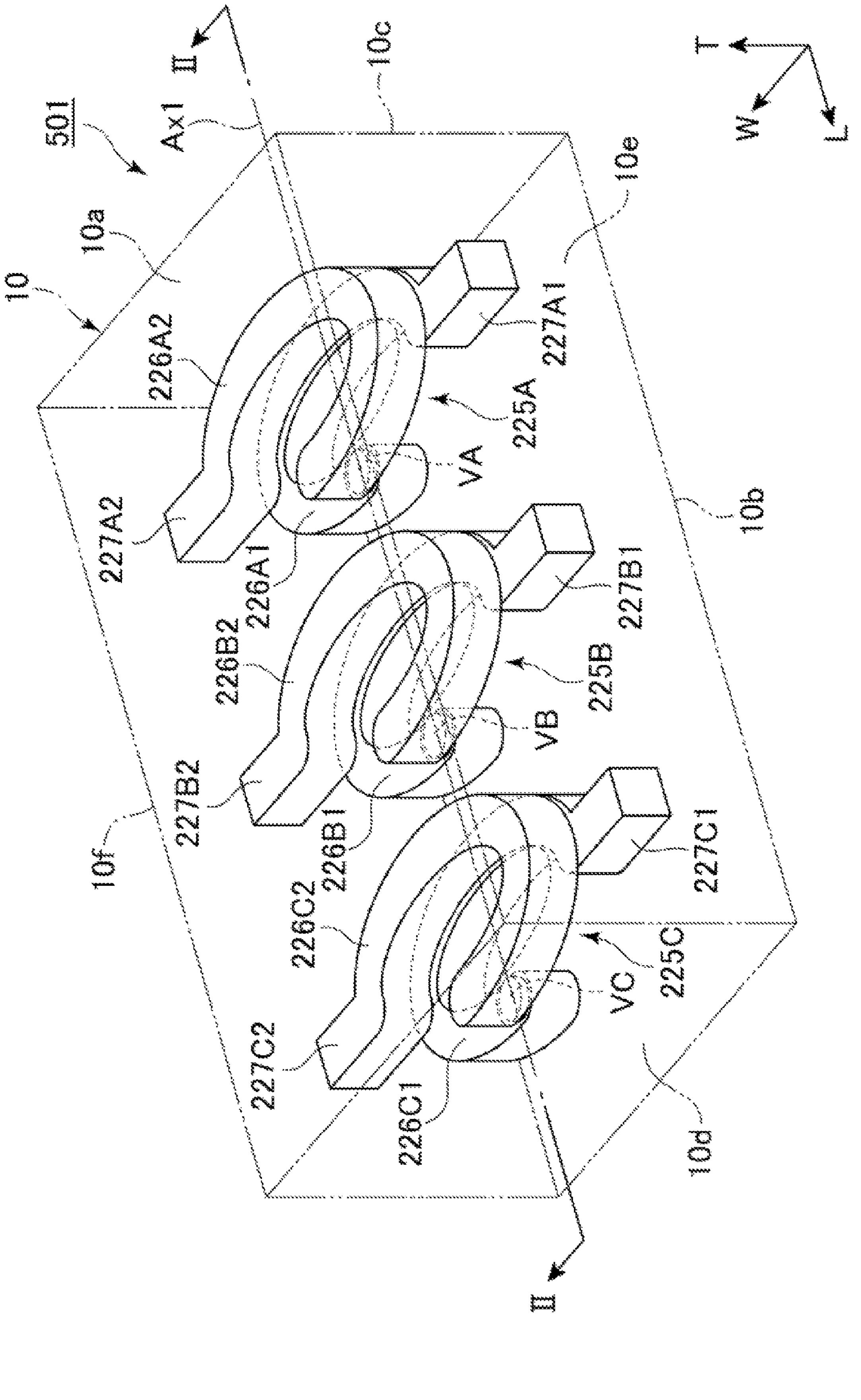
FIG. 9 is a perspective view of an inductor array according to another embodiment of the present invention.
Figure 10:
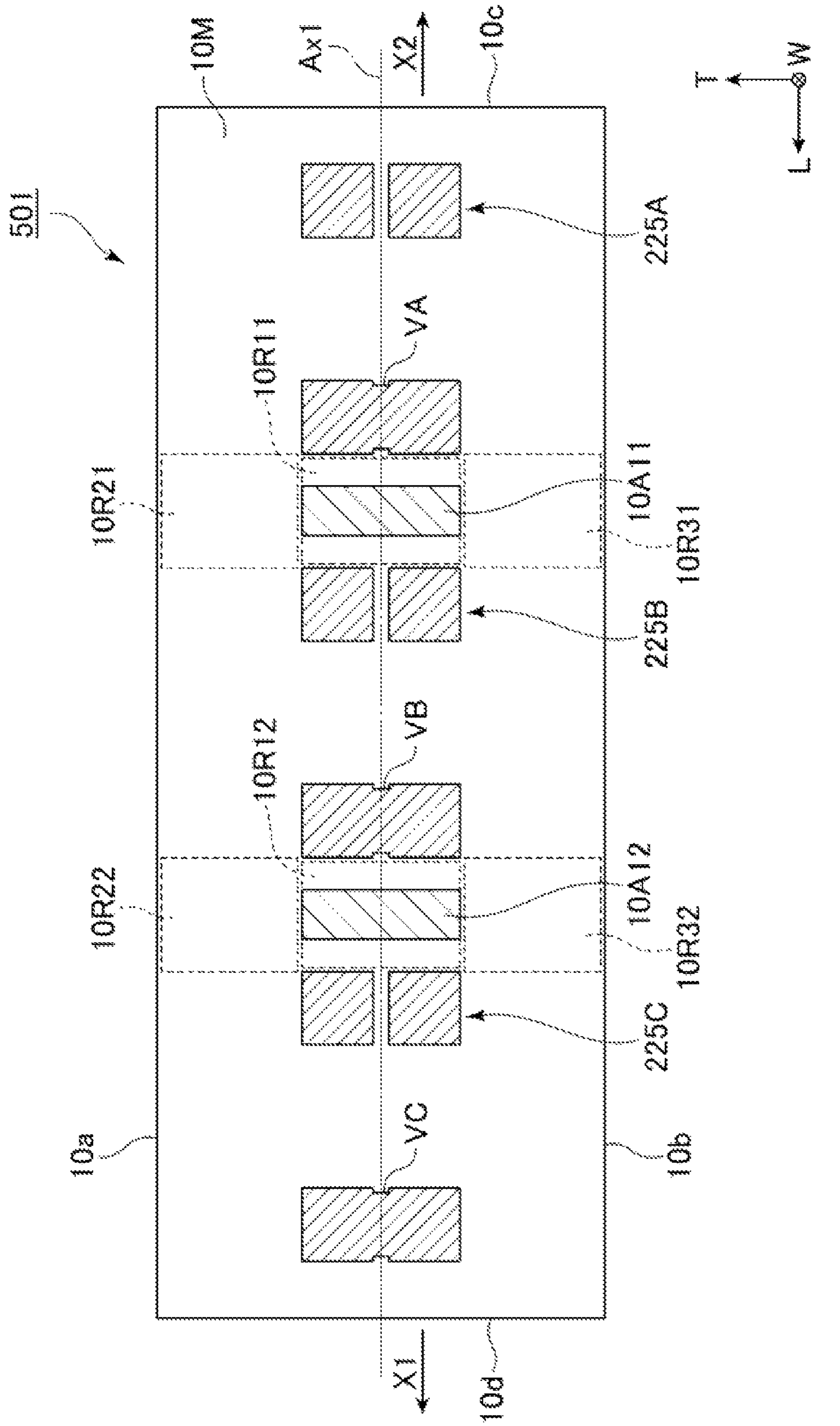
FIG. 10 is a schematic sectional view of the inductor array of FIG. 9 along the line II-II.

The following now describes an inductor array 501 according to another embodiment, to which the present invention is applicable, with reference to FIGS. 9 and 10. FIG. 9 is a perspective view of the inductor array 501, and FIG. 10 is a schematic sectional view of the inductor array 501 along the II-II line in FIG. 9. The inductor array 501 includes three lines of the internal conductors 225A and 225C. In the illustrated embodiment, the internal conductors 225A, 225B and 225C are each wound around a coil axis extending along the T axis (i.e., along the direction perpendicular to the reference axis Ax1). More specifically, the internal conductor 225A includes a first winding portion 226A1, a first lead-out conductor 227A1, a second winding portion 226A2, and a second lead-out conductor 227A2. The first winding portion 226A1 is wound approximately 0.75 turns around a coil axis (not shown) extending perpendicularly to the reference axis Ax1, the first lead-out conductor 227A1 is connected to one end of the first winding portion 226A1, the second winding portion 226A2 is connected to the other end of the first winding portion 226A1 via a via conductor VA and wound approximately 0.75 turns around the coil axis, and the second lead-out conductor 227A2 is connected to an end of the second winding portion 226A2 that is opposite to its end connected to the via conductor VA. As noted, the internal conductor 225A is wound around a coil axis approximately 1.5 turns. The internal conductor 225A is connected to the external electrode 21A at the first lead-out conductor 227A1 and connected to the external electrode 22A at the second lead-out conductor 227A2.

The internal conductors 225B and 225C are configured in the same manner as the internal conductor 225A. More specifically, the internal conductor 225B includes a first winding portion 226B1 wound approximately 0.75 turns around the coil axis, a first lead-out conductor 227B1 connected to one of the ends of the first winding portion 226B1, a second winding portion 226B2 connected to the other end of the first winding portion 226B1 via a via conductor VB and wound approximately 0.75 turns around the coil axis, and a second lead-out conductor 227B2 connected to an end of the second winding portion 226B2 opposite to the end connected to the via conductor VB. The internal conductor 225B is connected to the external electrode 21B at the first lead-out conductor 227B1 and connected to the external electrode 22B at the second lead-out conductor 227B2. The internal conductor 225C includes a first winding portion 226C1 wound approximately 0.75 turns around the coil axis, a first lead-out conductor 227C1 connected to one of the ends of the first winding portion 226C1, a second winding portion 226C2 connected to the other end of the first winding portion 226C1 via a via conductor VC and wound approximately 0.75 turns around the coil axis, and a second lead-out conductor 227C2 connected to an end of the second winding portion 226C2 opposite to the end connected to the via conductor VC. The internal conductor 225C is connected to the external electrode 21C at the first lead-out conductor 227C1 and connected to the external electrode 22C at the second lead-out conductor 227C2.

The internal conductors 225A, 225B and 225C all have the same shape. The internal conductors 225A, 225B and 225C, which are provided within the base body 10, may be placed at the same level in the T-axis direction. Specifically, as shown in FIG. 10, the internal conductors 225A, 225B and 225C are at the same level in the T-axis direction such that their respective top surfaces are at the same level in the T-axis direction and their respective bottom surfaces are at the same level in the T-axis direction.

The illustrated shape of the internal conductors 225A to 225C is an example. The shape of the internal conductors applicable to the invention is not limited to the specific example shown. For example, each of the internal conductors 225A to 225C may be wound around the respective coil axis more than 1.5 turns. For example, each of the internal conductors 225A to 225C may be wound around the respective coil axis 2.5 turns, 3.5 turns, or other numbers of turns. The number of turns of the first winding portions 226A1 to 226C1 and the second winding portion 226A2 to 226C2 is not limited to 0.75. The number of turns of each of the first winding portions 226A1 to 226C1 and the second winding portion 226A2 to 226C2 is in the range smaller than 1 and may be larger or smaller than 0.75.

The region of the base body 10 between the internal conductor 225A and the internal conductor 225B is the inter-conductor region 10R11, and the region between the internal conductor 225B and the internal conductor 225C is the inter-conductor region 10R12. As in the inductor array 1, the inter-conductor region 10R11 includes the high-permeability portion 10A11, and the inter-conductor region 10R12 includes the high-permeability portion 10A12.

In the inductor array 501 configured as described above, the high-permeability portions 10A11, 10A12 disposed in the inter-conductor regions lessen the coupling between the internal conductors 225A to 225C disposed in the base body 10.

As with the inductor array 101, the inductor array 501 may include, in addition to the high-permeability portions 10A11, 10A12, the high-permeability portions 10A21, 10A22, 10A31, 10A32 in at least one of the upper margin regions 10R21, 10R22 and the lower margin regions 10R31, 10R32. The high-permeability portions 10A21, 10A22, 10A31, 10A32 further lessen the coupling between the internal conductors 225A to 225C.

The components constituting the internal conductor 225A, that is, the first winding portion 226A1, the first lead-out conductor 227A1, the second winding portion 226A2, and the second lead-out conductor 227A2 may each have two or more layers of conductor patterns stacked in the T-axis direction. Likewise, the components constituting the internal conductors 225B to 225C may each have two or more layers of conductor patterns stacked in the T-axis direction.

The internal conductors 225A to 225C may be substituted for the internal conductors 25A to 25D in the inductor arrays 201, 301. For example, in the inductor array 201, the internal conductors 25A to 25C may be replaced with the internal conductors 225A to 225C, and the internal conductor 25D may be replaced with an internal conductor having the same shape as the internal conductor 225A. In the inductor array 301, the internal conductors 25A to 25C may be replaced with the internal conductors 225A to 225C, and the internal conductor 25D may be replaced with an internal conductor having the same shape as the internal conductor 225A.

Next, a description is given of an example method of manufacturing the inductor array 1 according to one embodiment of the present invention. In one or more embodiments of the invention, the inductor array 1 is produced by a sheet lamination method in which magnetic sheets are stacked together. The first step of the sheet lamination method for producing the inductor array 1 is to prepare the magnetic sheets. The magnetic sheets are, for example, made from a slurry obtained by mixing and kneading a resin and metal magnetic particles of a soft magnetic material. The slurry is molded into the magnetic sheets using a sheet molding machine such as a doctor blade sheet molding machine. The resin mixed and kneaded together with the metal magnetic particles may be, for example, a polyvinyl butyral (PVB) resin, an epoxy resin, or any other resin materials having an excellent insulation property. The materials for preparing the magnetic sheets are selected such that the magnetic sheets will have, after firing, a relative permeability required for the body portion 10M of the base body 10.

The magnetic sheets are cut into a predetermined shape. Next, a conductive paste is applied by a known method such as screen printing to the magnetic sheets cut into the predetermined shape, thereby forming a plurality of unfired conductor patterns that will form the internal conductors 25A to 25D after firing. The conductive paste is made by mixing and kneading, for example, Ag, Cu, or alloys thereof and a resin. Through-holes having a shape corresponding to the unfired conductor patters are provided in a part of the magnetic sheets, and the through-holes are then filled with a magnetic material different from the magnetic material used for forming the magnetic sheets, thereby embedding filled portions formed of the magnetic material in the part of the magnetic sheets. The magnetic material for the filled portions is selected such that the filled portions will have, after firing, a relative permeability required for the high-permeability portions 10A11 to 10A13. The filled portions will form the high-permeability portions 10A11 to 10A13 after firing.

In the way described above, the magnetic sheets having the unfired conductor patterns formed thereon, the magnetic sheets having the filled portions embedded therein, and the magnetic sheets having no conductors formed thereon and having no filled portions embedded therein are stacked together to form a mother laminate.

Next, the mother laminate is diced using a cutter such as a dicing machine or a laser processing machine to obtain a chip laminate.

Next, the chip laminate is subjected to heat treatment at a temperature of 600° C. to 850° C. for a duration of 20 to 120 minutes. This heat treatment degreases the chip laminate, and the magnetic sheets and the conductor paste are fired to form the base body 10 that contains the internal conductors 25A to 25D. If the magnetic sheets contain a thermosetting resin, the thermosetting resin may be cured by performing a heat treatment on the chip laminate at a lower temperature. This cured resin serves as the binder that binds together the metal magnetic particles contained in the magnetic sheet. The heat treatment at a lower temperature is performed at a temperature of 100° C. to 200° C. for a duration of approximately 20 to 120 minutes, for example.

Following the heat treatment, a conductive paste is applied to the surface of the chip laminate (that is, the base body 10) to form the external electrodes 21A to 21D, 22A to 22D. In the above-described manner, the inductor array 1 is obtained. The inductor arrays 101, 201, 301, 401 and 501 can be made using the same manufacturing method as the inductor array 1.

In manufacturing the inductor array 301, first through-holes having a shape corresponding to the unfired conductor patterns formed on the magnetic sheets can be filled with a magnetic material different from the magnetic material used in the manufacturing process of the inductor array 1. In the manufacturing process of the inductor array 301, the magnetic material for the filled portions is selected such that the filled portions will have, after firing, a relative permeability required for the low-permeability portions 10B11 to 10B13.

In manufacturing the inductor array 101, second through-holes and third through-holes for receiving the high-permeability portions 10A21 to 10A23, 10A31 to 10A33 are provided in addition to first through-holes having a shape corresponding to the unfired conductor patterns. The second through-holes and the third through-holes are provided outside the first through-holes. The second through-holes and the third through-holes are filled with a magnetic material different from the magnetic material used for forming the magnetic sheets. Thus, second filled portions are embedded in the second through-holes, and third filled portions are embedded in the third through-holes. The magnetic material for the second filled portions and the third filled portions is selected such that the second filled portions will have, after firing, a relative permeability required for the high-permeability portions 10A21 to 10A23, and the third filled portions will have, after firing, a relative permeability required for the high-permeability portions 10A31 to 10A33. The second filled portions will form the high-permeability portions 10A21 to 10A23 after firing, and the third filled portions will form the high-permeability portions 10A31 to 10A33 after firing. The magnetic material that forms the high-permeability portions 10A21 to 10A23, 10A31 to 10A33 may be applied by a printing method to portions of the magnetic sheets having no through-holes formed therein, instead of being filled into the through-holes formed in the magnetic sheets. Since no through-holes for receiving the high-permeability portions 10A21 to 10A23, 10A31 to 10A33 embedded therein are formed in the magnetic sheets, the magnetic sheets can have a higher strength.

In manufacturing the inductor array 301, the manufacturing process of the inductor array 101 is modified as follows. Specifically, the magnetic material used for the second filled portions, which was described for the manufacturing process of the inductor array 101, has a relative permeability required for the low-permeability portions 10B21 to 10B23, and the magnetic material used for the third filled portions has a relative permeability required for the low-permeability portions 10B31 to 10B33. Thus, after firing, the second filled portions will form the low-permeability portions 10B21 to 10B23, and the third filled portions will form the low-permeability portions 10B31 to 10B33.

The manufacturing method described above is susceptible of omitting a part of the steps, adding steps not explicitly referred to, and/or reordering the steps. A procedure subjected to such omission, addition, or reordering is also included in the scope of the present invention unless diverged from the purport of the present invention.

The method of manufacturing the inductor array 1 is not limited to the method described above. The inductor array 1 may be produced by a lamination method other than the sheet lamination method (e.g., the printing lamination method), the thin film process, the compression molding process, or other known methods.

The dimensions, materials, and arrangements of the constituent elements described for the above various embodiments are not limited to those explicitly described for the embodiments, and these constituent elements can be modified to have any dimensions, materials, and arrangements within the scope of the present invention.

Constituent elements not explicitly described herein can also be added to the above-described embodiments, and it is also possible to omit some of the constituent elements described for the embodiments.

The words "first," "second," and "third" used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituent elements from performing the functions of the constituent elements identified by other numbers.

What is claimed is:

1. An inductor array comprising:

a plurality of linear internal conductors spaced apart from each other along a reference axis, each of the linear internal conductors comprising a length in a first direction that is along the reference axis, a width in a second direction that is perpendicular to the reference axis, and a thickness in a third direction that is perpendicular to the reference axis and different from the second direction;

a magnetic base body including:

a body portion having the plurality of linear internal conductors embedded therein; and a first high-permeability portion having a higher relative permeability than the body portion and occupying at least a part of an inter-conductor region between a first linear internal conductor and a second linear internal conductor among the plurality of linear internal conductors, the first linear internal conductor and the second linear internal conductor being adjacent to each other in a reference axis direction along the reference axis;

a plurality of first external electrodes each connected to one end of associated one of the plurality of internal conductors; and a plurality of second external electrodes each connected to the other end of associated one of the plurality of internal conductors, wherein the first high-permeability portion is disposed between the first linear internal conductor and the second linear internal conductor such that the first high-permeability portion is spaced apart from both the first linear internal conductor and the second linear internal conductor in the reference axis direction and wherein a thickness of the first high-permeability portion taken perpendicular the reference axis in the third direction is at least the same as or greater than each thickness of each of the first internal conductor and the second internal conductor.

2. The inductor array of claim 1, wherein the first high-permeability portion is in contact with at least one of the first internal conductor or the second internal conductor.

3. The inductor array of claim 1, wherein the first high-permeability portion extends in the reference axis direction over an intermediate point between the first internal conductor and the second internal conductor in the reference axis direction.

4. The inductor array of claim 1, wherein the first high-permeability portion is positioned to cover entire regions of the first internal conductor and the second internal conductor as viewed from the reference axis direction.

5. The inductor array of claim 1, wherein the magnetic base body has a first surface, a second surface opposed to the first surface in the reference axis direction, and a third surface connecting between the first surface and the second surface, and wherein the magnetic base body includes a second high-permeability portion having a higher relative permeability than the body portion and occupying at least a part of a first margin region between the inter-conductor region and the third surface.

6. The inductor array of claim 5, wherein the body portion interposes between the first internal conductor and the third surface and between the second internal conductor and the third surface.

7. The inductor array of claim 5, wherein the magnetic base body has a fourth surface opposed to the third surface, wherein the magnetic base body includes a third high-permeability portion having a higher relative permeability than the body portion, and wherein the third high-permeability portion occupies at least a part of a second margin region between the inter-conductor region and the fourth surface.

8. The inductor array of claim 5, wherein the first high-permeability portion is in contact with the second high-permeability portion.

9. A circuit board comprising the inductor array of claim 1.

10. An electronic device comprising the circuit board of claim 9.

* * * * *